United States Patent
Colley et al.

(10) Patent No.: US 11,834,955 B1
(45) Date of Patent: Dec. 5, 2023

(54) VARIABLE TURBINE GEOMETRY ASSEMBLY

(71) Applicant: BorgWarner Inc., Auburn Hills, MI (US)

(72) Inventors: Matthew Carson Colley, Mills River, NC (US); Greg Williams, Arden, NC (US)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 18/128,149

(22) Filed: Mar. 29, 2023

(51) Int. Cl.
 *F01D 17/16* (2006.01)
 *F02C 6/12* (2006.01)
 *F02B 37/24* (2006.01)

(52) U.S. Cl.
 CPC ............ *F01D 17/165* (2013.01); *F02B 37/24* (2013.01); *F02C 6/12* (2013.01)

(58) Field of Classification Search
 CPC ........... F01D 17/165; F02B 37/24; F02C 6/12
 See application file for complete search history.

(56) References Cited

U.S. PATENT DOCUMENTS

| | | | | |
|---|---|---|---|---|
| 8,668,443 B2 * | 3/2014 | Espasa | ................. | F01D 17/165 415/165 |
| 8,696,307 B2 * | 4/2014 | Garrett | ................. | F01D 17/143 415/157 |
| 9,982,557 B2 * | 5/2018 | Ward | ................. | F01D 17/165 |
| 10,253,683 B2 * | 4/2019 | Musil | ................. | F04D 17/10 |
| 10,385,722 B2 * | 8/2019 | Kennedy | ................. | F02B 37/24 |
| 11,168,579 B2 * | 11/2021 | Ehrhard | ................. | F02B 37/00 |
| 11,378,123 B2 * | 7/2022 | Kelly | ................. | F02C 6/12 |
| 2010/0232937 A1 * | 9/2010 | Wengert | ................. | F01D 17/165 415/160 |
| 2023/0135874 A1 * | 5/2023 | Biswas | ................. | F01D 17/165 415/209.1 |
| 2023/0175414 A1 * | 6/2023 | Cavagnaro | ............ | F01D 17/165 60/605.1 |

OTHER PUBLICATIONS

U.S. Appl. No. 17/542,791, filed Dec. 6, 2021.

* cited by examiner

*Primary Examiner* — Jesse S Bogue
(74) *Attorney, Agent, or Firm* — Howard & Howard Attorneys PLLC

(57) ABSTRACT

A variable turbine geometry assembly for controlling flow of exhaust gas to a turbine wheel of a turbocharger includes an adjustment ring extending about an axis and rotatable about the axis, at least one vane lever coupled to the adjustment ring, and at least one vane coupled to the at least one vane lever. The at least one vane is moveable with respect to the adjustment ring when the adjustment ring rotates about the axis. The variable turbine geometry assembly further includes a wave spring operably in contact with at least one of the at least one vane lever and the adjustment ring. The wave spring is configured to bias one of the at least one vane lever and the adjustment ring toward the other of the at least one vane lever and the adjustment ring.

20 Claims, 11 Drawing Sheets

VARIABLE TURBINE GEOMETRY ASSEMBLY

BACKGROUND OF THE INVENTION

1. Field of the Invention

The invention generally relates to a variable turbine geometry assembly for controlling flow of exhaust gas to a turbine wheel of a turbocharger.

2. Description of the Related Art

Turbochargers receive exhaust gas from an internal combustion engine and deliver compressed air to the internal combustion engine. Turbochargers are used to increase power output of the internal combustion engine, lower fuel consumption of the internal combustion engine, and reduce emissions produced by the internal combustion engine. Delivery of compressed air to the internal combustion engine by the turbocharger allows the internal combustion engine to be smaller, yet able to develop the same or similar amount of horsepower as larger, naturally aspirated internal combustion engines. Having a smaller internal combustion engine for use with a vehicle reduces the mass and aerodynamic frontal area of the vehicle, which helps reduce fuel consumption of the internal combustion engine and improve fuel economy of the vehicle.

Typical turbochargers include a turbine housing defining a turbine housing interior, a turbine wheel disposed in the turbine housing interior for receiving exhaust gas from the internal combustion engine, and a shaft coupled to and rotatable by the turbine wheel. Typical turbochargers also include a compressor housing defining a compressor housing interior, and a compressor wheel disposed in the compressor housing interior and coupled to the shaft, with the compressor wheel being rotatable by the shaft for delivering compressed air to the internal combustion engine. Specifically, energy from the exhaust gas from the internal combustion engine, which would normally be wasted energy, is used to rotatably drive the turbine wheel, which is used to rotatably drive the shaft and, in turn, rotatably drive the compressor wheel to compress air and deliver compressed air to the internal combustion engine.

Commonly, turbochargers include a variable turbine geometry assembly disposed about the turbine wheel. Variable turbine geometry assemblies are known to control flow of exhaust gas to the turbine wheel of the turbocharger. However, variable turbine geometry assemblies known in the art are subject to failure due to repeated wear on various components of the variable turbine geometry assembly caused by vibrations between the various components of the variable turbine geometry assembly. Wear on components of the variable turbine geometry assembly caused by vibrations between various components of the variable turbine geometry assembly can result in increased noise, even further increased vibrations, and increased harshness (NVH) of the turbocharger. Moreover, wear on components can also result in functional failure of the variable turbine geometry assembly, resulting in the variable turbine geometry assembly failing to adequately control flow of exhaust gas to the turbine wheel of the turbocharger.

As such, there remains a need for an improved variable turbine geometry assembly for a turbocharger.

SUMMARY OF THE INVENTION AND ADVANTAGES

A variable turbine geometry assembly for controlling flow of exhaust gas to a turbine wheel of a turbocharger includes an adjustment ring extending about an axis and rotatable about the axis. The variable turbine geometry assembly also includes at least one vane lever coupled to the adjustment ring and at least one vane coupled to the at least one vane lever. The at least one vane is moveable with respect to the adjustment ring with the adjustment ring rotates about the axis. The variable turbine geometry assembly further includes a wave spring operably in contact with at least one of the at least one vane lever and the adjustment ring. The wave spring is configured to bias one of the at least one vane lever and the adjustment ring toward the other of the at least one vane lever and the adjustment ring.

With the wave spring configured to bias one of the at least one vane lever and the adjustment ring toward the other of the at least one vane lever and the adjustment ring, vibration between the adjustment ring and the at least one vane lever is reduced. Reduced vibration between the adjustment ring and the at least one vane lever reduces wear between various components of the variable turbine geometry assembly. More specifically, reduced vibration between the adjustment ring and the at least one vane lever reduces wear on the adjustment ring and on the at least one vane lever. Reduced wear on the adjustment ring and the at least one vane lever further reduces noise, vibration, and harshness (NVH) of the turbocharger, as well as lowers the likelihood of functional failure of the variable turbine geometry assembly adequately controlling flow of exhaust gas to the turbine wheel of the turbocharger. Moreover, the wave spring provides a simple, cost-effective, and durable solution while achieving the advantages described above.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
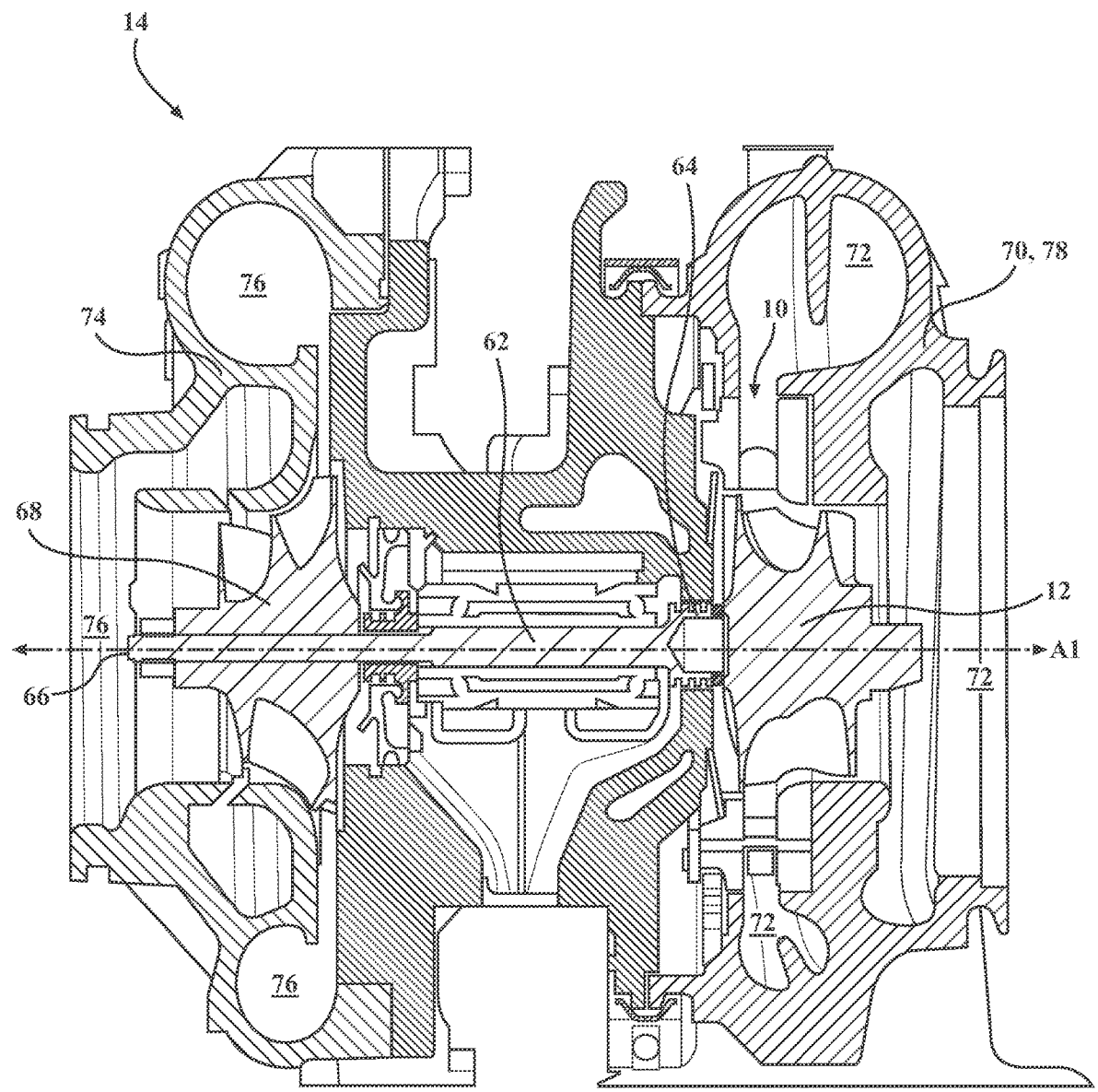
FIG. 1 is a cross-sectional view of a turbocharger including a turbine housing defining a turbine housing interior, a turbine wheel disposed in the turbine housing interior, a variable turbine geometry assembly disposed about the turbine wheel, a shaft rotatably coupled to the turbine wheel, a compressor housing defining a compressor housing interior, and a compressor wheel disposed in the compressor housing interior and rotatably coupled to the shaft.

With reference to the Figures, wherein like numerals indicate like parts throughout the several views, a variable turbine geometry assembly 10 for controlling flow of exhaust gas to a turbine wheel 12 of a turbocharger 14 is shown in FIGS. 1-11. The variable turbine geometry assembly 10 includes an adjustment ring 16 extending about an axis A1 and rotatable about the axis A1. The variable turbine geometry assembly 10 also includes at least one vane lever 18 coupled to the adjustment ring 16, and the variable turbine geometry assembly 10 includes at least one vane 20 coupled to the at least one vane lever 18. The at least one vane 20 is moveable with respect to the adjustment ring 16 when the adjustment ring 16 rotates about the axis A1. The variable turbine geometry assembly 10 further includes a wave spring 22 operably in contact with at least one of the at least one vane lever 18 and the adjustment ring 16. In other words, the wave spring 22 is operably in contact with the at least one vane lever 18, the adjustment ring 16, or both the at least one vane lever 18 and the adjustment ring 16. The wave spring 22 is configured to bias one of the at least one vane lever 18 and the adjustment ring 16 toward the other of the at least one vane lever 18 and the adjustment ring 16. Said differently, the wave spring 22 is either configured to bias the at least one vane lever 18 toward the adjustment ring 16 or configured to bias the adjustment ring 16 toward the at least one vane lever 18.

The wave spring 22 being configured to bias one of the at least one vane lever 18 and the adjustment ring 16 toward the other of the at least one vane lever 18 and the adjustment ring 16 reduces vibration between the adjustment ring 16 and the at least one vane lever 18. In other words, the wave spring 22 may be configured to reduce vibration between the adjustment ring 16 and the at least one vane lever 18. Accordingly, reduced vibration between the adjustment ring 16 and the at least one vane lever 18 reduces wear between various components of the variable turbine geometry assembly 10. More specifically, reduced vibration between the adjustment ring 16 and the at least one vane lever 18 reduces wear on the adjustment ring 16 and on the at least one vane lever 18. Reduced wear on the adjustment ring 16 and the at least one vane lever 18 further reduces noise, vibration, and harshness (NVH) of the turbocharger 14, as well as lowers the likelihood of functional failure of the variable turbine geometry assembly 10 adequately controlling flow of exhaust gas to the turbine wheel 12 of the turbocharger 14. Moreover, the wave spring 22 provides a simple, cost-effective, and durable solution while achieving the advantages described above.

The variable turbine geometry assembly 10 may further include a first vane ring 82 extending about the axis A1, and the variable turbine geometry assembly 10 may also further include a second vane ring 84 extending about the axis A1. The second vane ring 84 may be spaced from the first vane ring 82 such that the at least one vane 20 is disposed between the first vane ring 82 and the second vane ring 84. The first vane ring 82 and the second vane ring 84 support movement of the at least one vane 20 when the adjustment ring 16 rotates about the axis A1.

Figure 2:
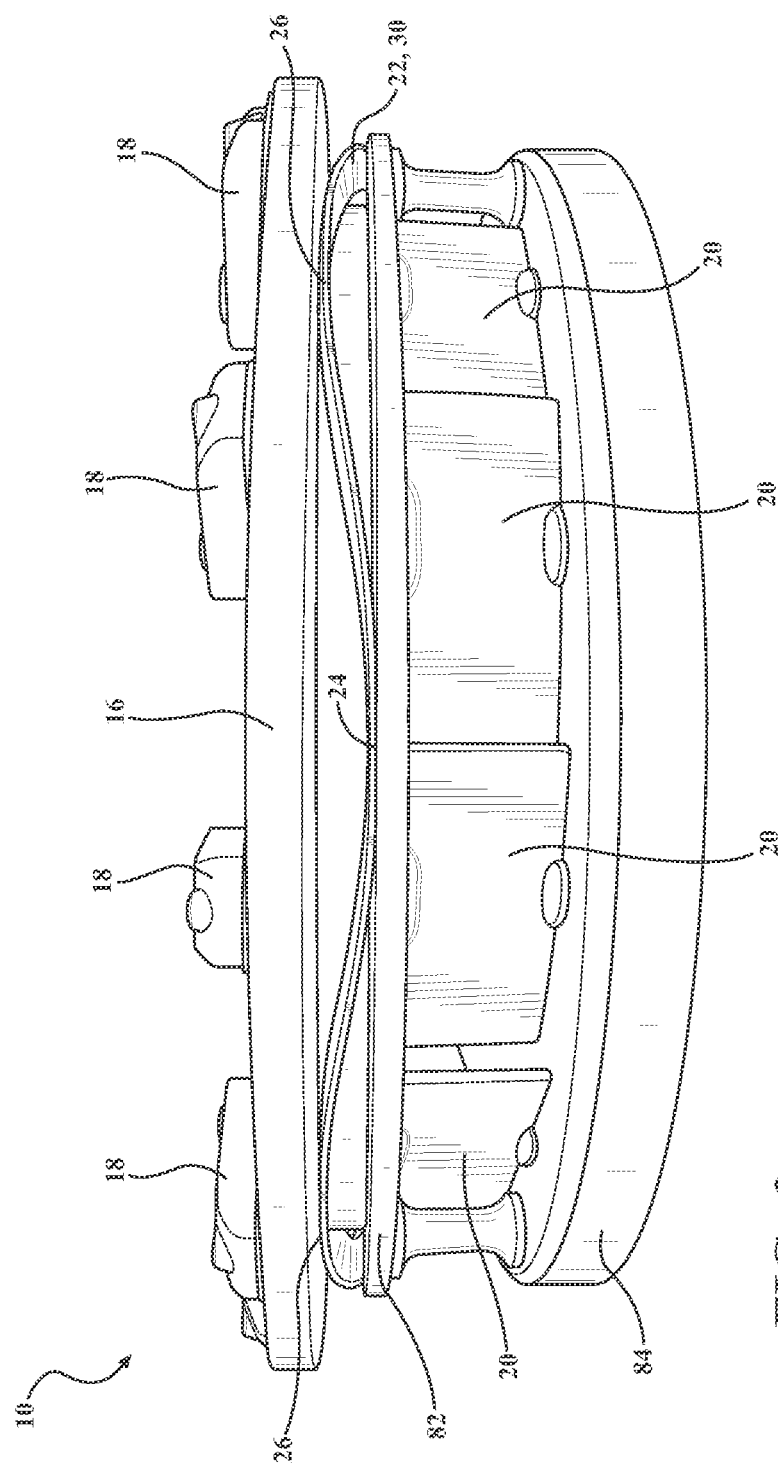
FIG. 2 is a perspective view of the variable turbine geometry assembly according to one embodiment, with the variable turbine geometry assembly including an adjustment ring, at least one vane lever, at least one vane, a first vane ring, a second vane ring, and a wave spring disposed between the adjustment ring and the first vane ring.
Figure 9:
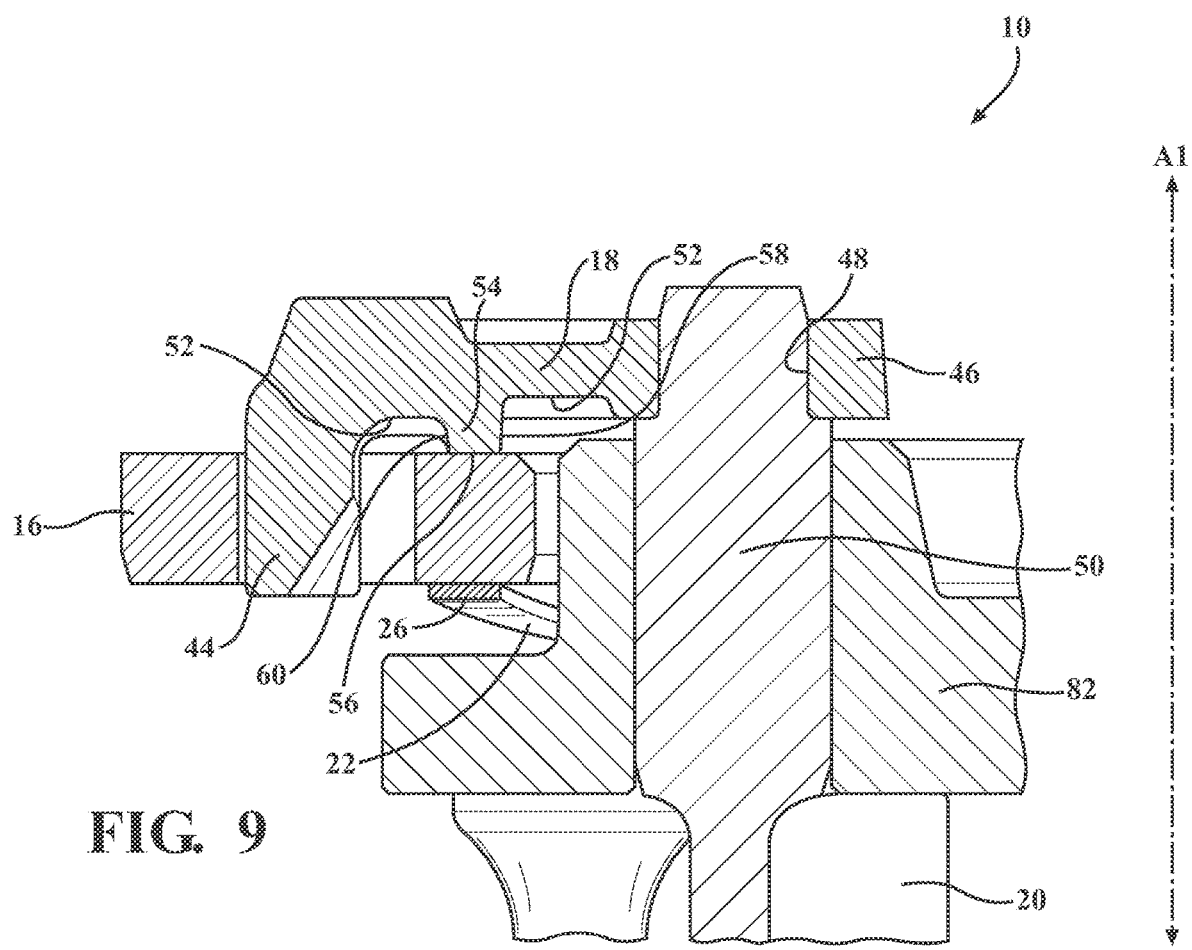
FIG. 9 is a cross-sectional view of the adjustment ring, the at least one vane lever, the at least one vane, the first vane ring, and the wave spring of FIG. 2.
Figure 10:
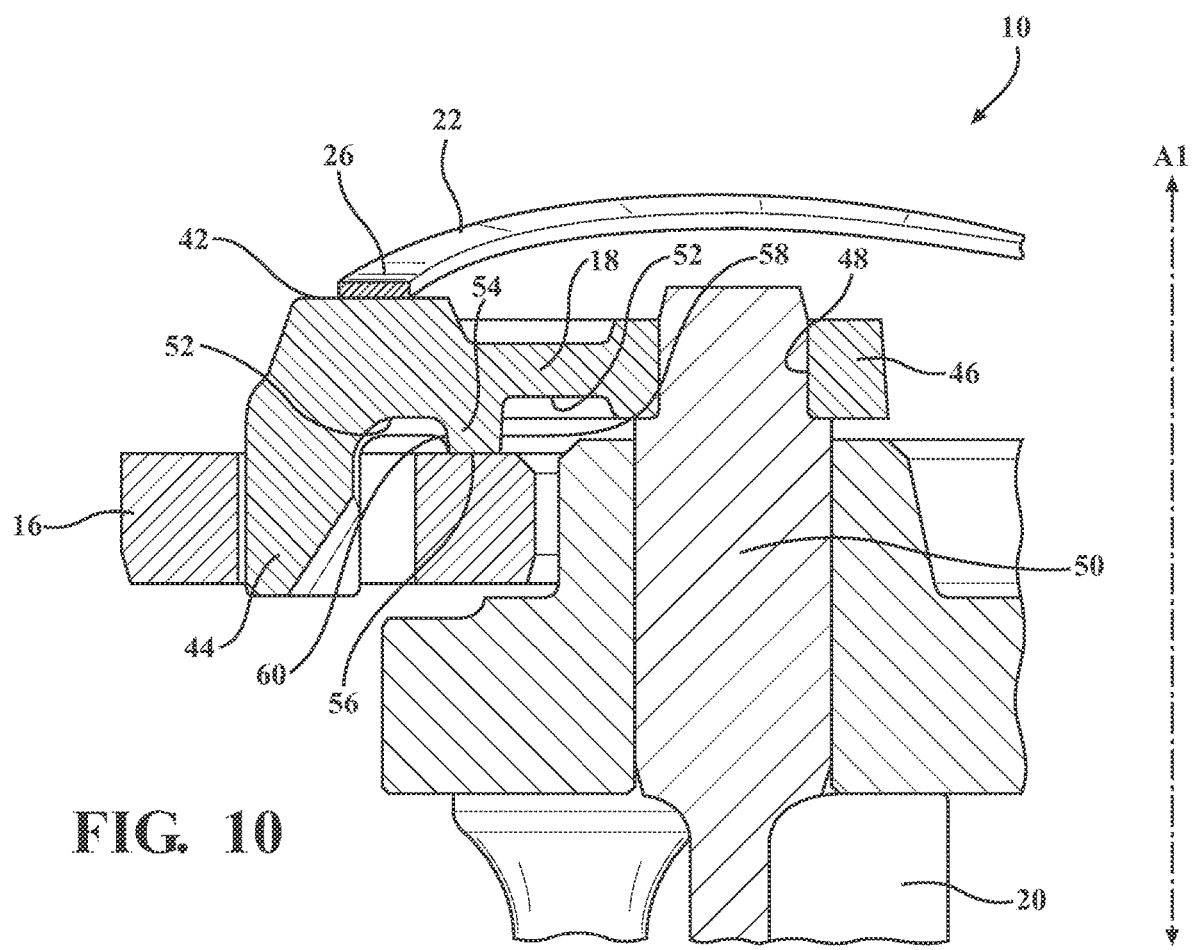
FIG. 10 is a cross-sectional view of the adjustment ring, the at least one vane lever, the at least one vane, and the wave spring, with the at least one vane lever including an axial stop.
Figure 11:
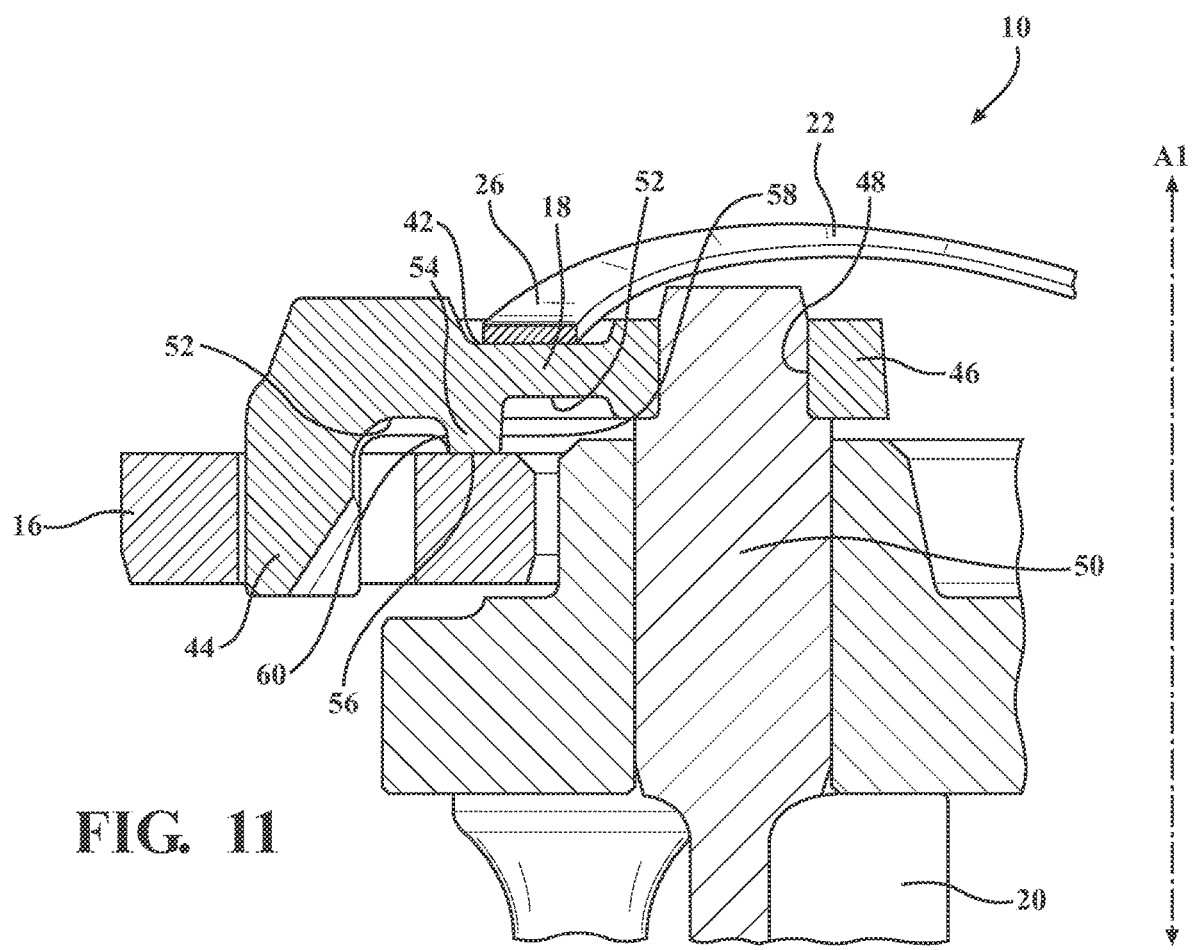
FIG. 11 is a cross-sectional view of the adjustment ring, the at least one vane lever, the at least one vane, and the wave spring, with the at least one vane lever having a contact surface indented axially to seat the wave spring.

In one embodiment, as shown in FIGS. 2 and 9, the wave spring 22 is disposed between the adjustment ring 16 and the at least one vane 20. Moreover, the wave spring 22 may be disposed between the adjustment ring 16 and the first vane ring 82. The wave spring 22 may be in direct contact with the first vane ring 82. However, it is to be appreciated that the wave spring 22 need not be in direct contact with the first vane ring 82. The wave spring 22 may only be in operable contact with the first vane ring 82. As such, there may be included an additional component(s) disposed between the wave spring 22 and the first vane ring 82. Additionally, the wave spring 22 may be in direct contact with the adjustment ring 16. However, it is to be appreciated that the wave spring 22 need not be in direct contact with the adjustment ring 16. The wave spring 22 may only be in operable contact with the adjustment ring 16. As such, there may be included an additional component(s) disposed between the wave spring 22 and the adjustment ring 16.

The wave spring 22 may be in direct contact with the at least one vane lever 18, as shown in FIGS. 3-8, 10, and 11. However, it is to be appreciated that the wave spring 22 need not be in direct contact with the at least one vane lever 18. The wave spring 22 may only be in operable contact with the at least one vane lever 18. As such, there may be included an additional component(s) disposed between the wave spring 22 and the at least one vane lever 18 Even with the embodiments having an additional component(s) disposed between the wave spring 22 and the at least one vane lever 18, vibration is reduced between the adjustment ring 16 and the at least one vane lever 18.

The wave spring 22 may include at least one peak 24 extending away from the adjustment ring 16. The wave spring 22 may also include at least one trough 26 extending toward the adjustment ring 16. It is to be appreciated that the wave spring 22 may include at least two peaks 24 extending away from the adjustment ring 16 and at least two troughs 26 extending toward the adjustment ring 16. Moreover, the wave spring 22 may include at least three peaks 24 extending away from the adjustment ring 16 and at least three troughs 26 extending toward the adjustment ring 16.

As shown in FIGS. 2 and 9, the at least one trough 26 may be in direct contact with the adjustment ring 16. However, it is to be appreciated that the at least one trough 26 need not be in direct contact with the adjustment ring 16. The at least one trough 26 may only be in operable contact with the adjustment ring 16. As such, there may be included an additional component(s) disposed between the at least one trough 22 and the adjustment ring 16. Moreover, the at least one trough 22 may extend toward the first vane ring 82, and the at least one trough 22 may be in direct contact with the first vane ring 82. It is to be appreciated that the at least one trough 26 need not be in direct contact with the first vane ring 82. The at least one trough 26 may only be in operable contact with the first vane ring 82. As such, there may be included an additional component(s) disposed between the at least one trough 22 and the first vane ring 82.

Figure 6:
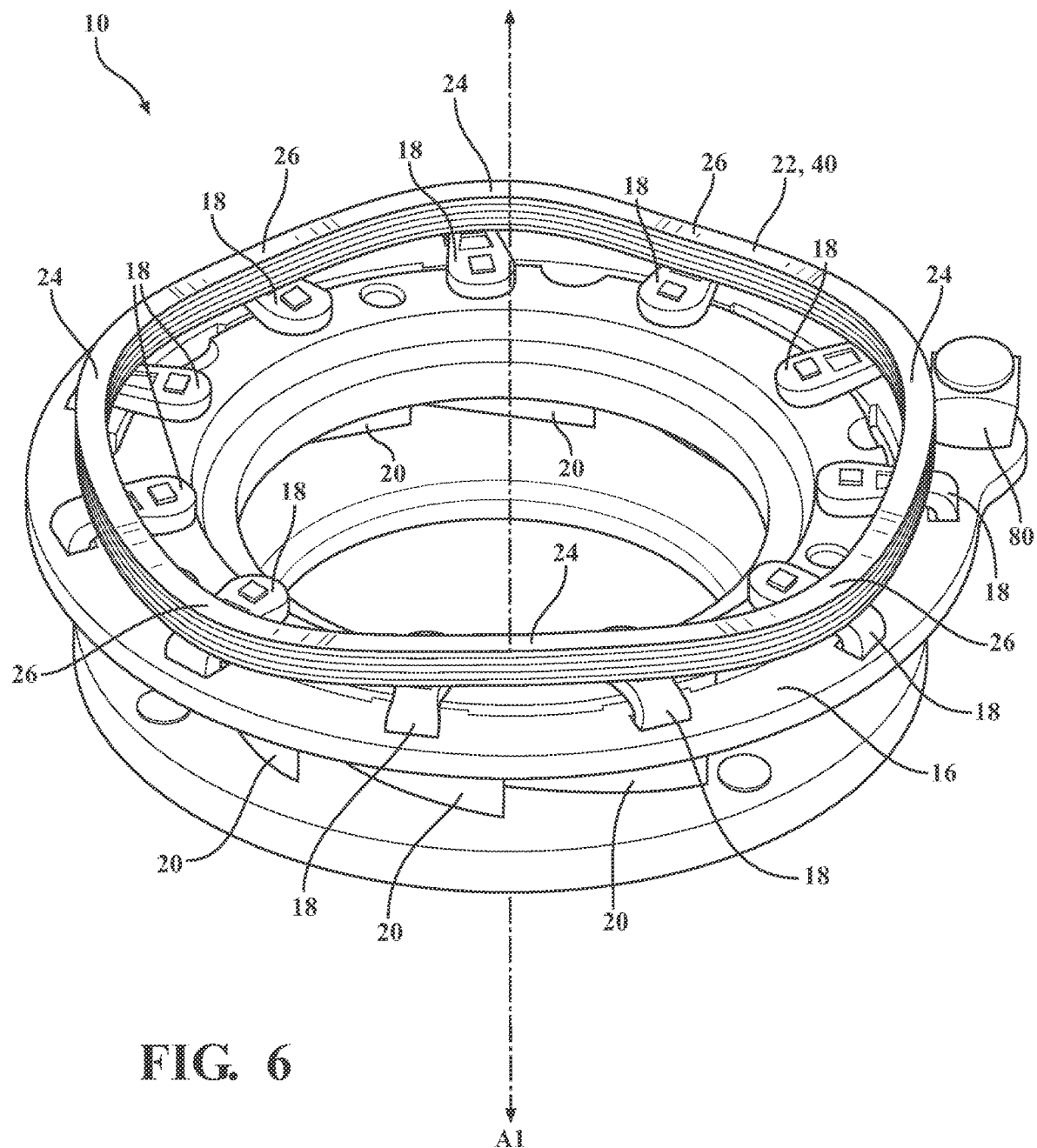
FIG. 6 is a perspective view of the variable turbine geometry assembly according to another embodiment, with the variable turbine geometry assembly including the wave spring, with the wave spring being a nested wave spring.
Figure 7:
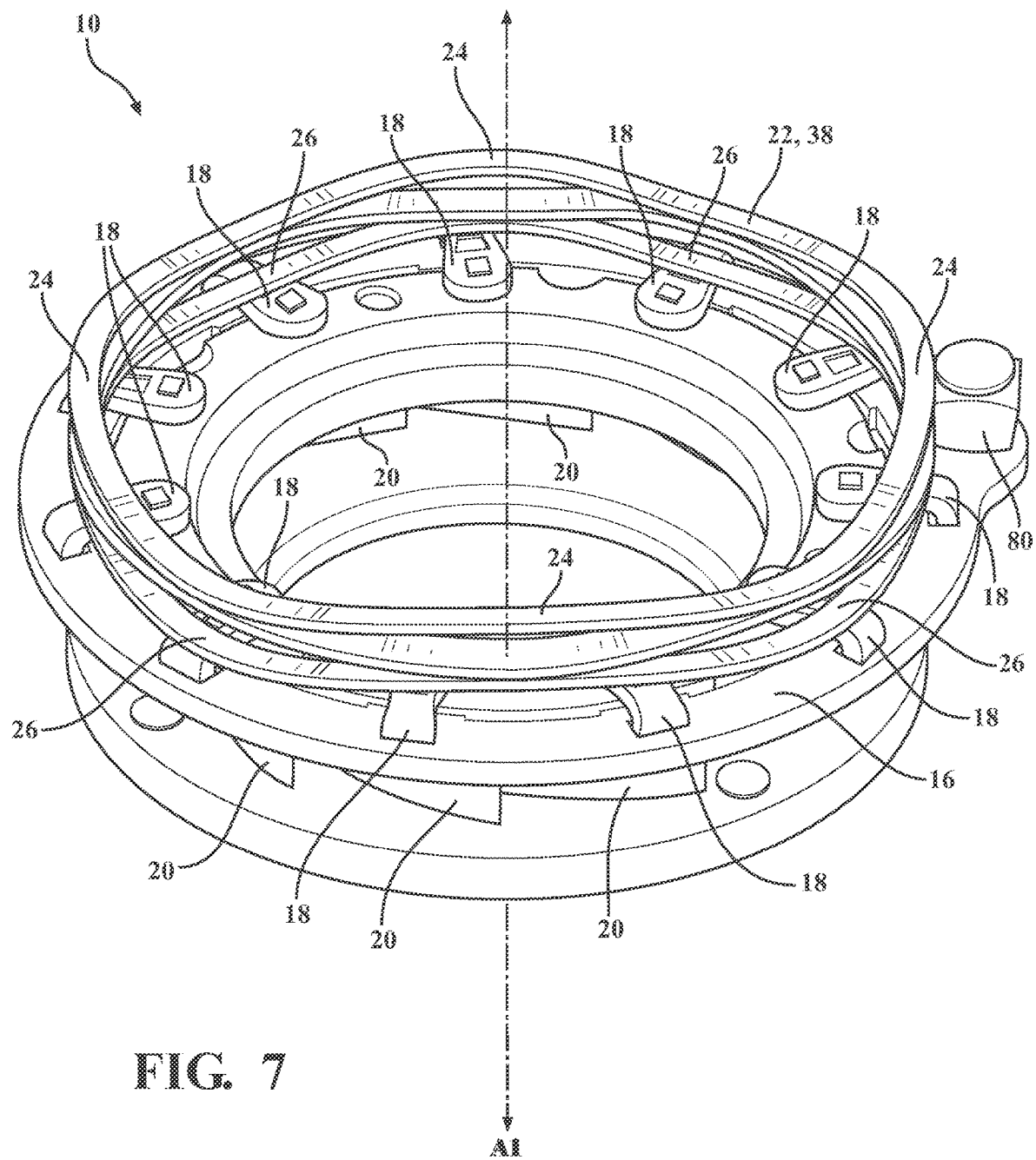
FIG. 7 is a perspective view of the variable turbine geometry assembly according to another embodiment, with the variable turbine geometry assembly including the wave spring, with the wave spring being a multi-turn wave spring.
Figure 8:
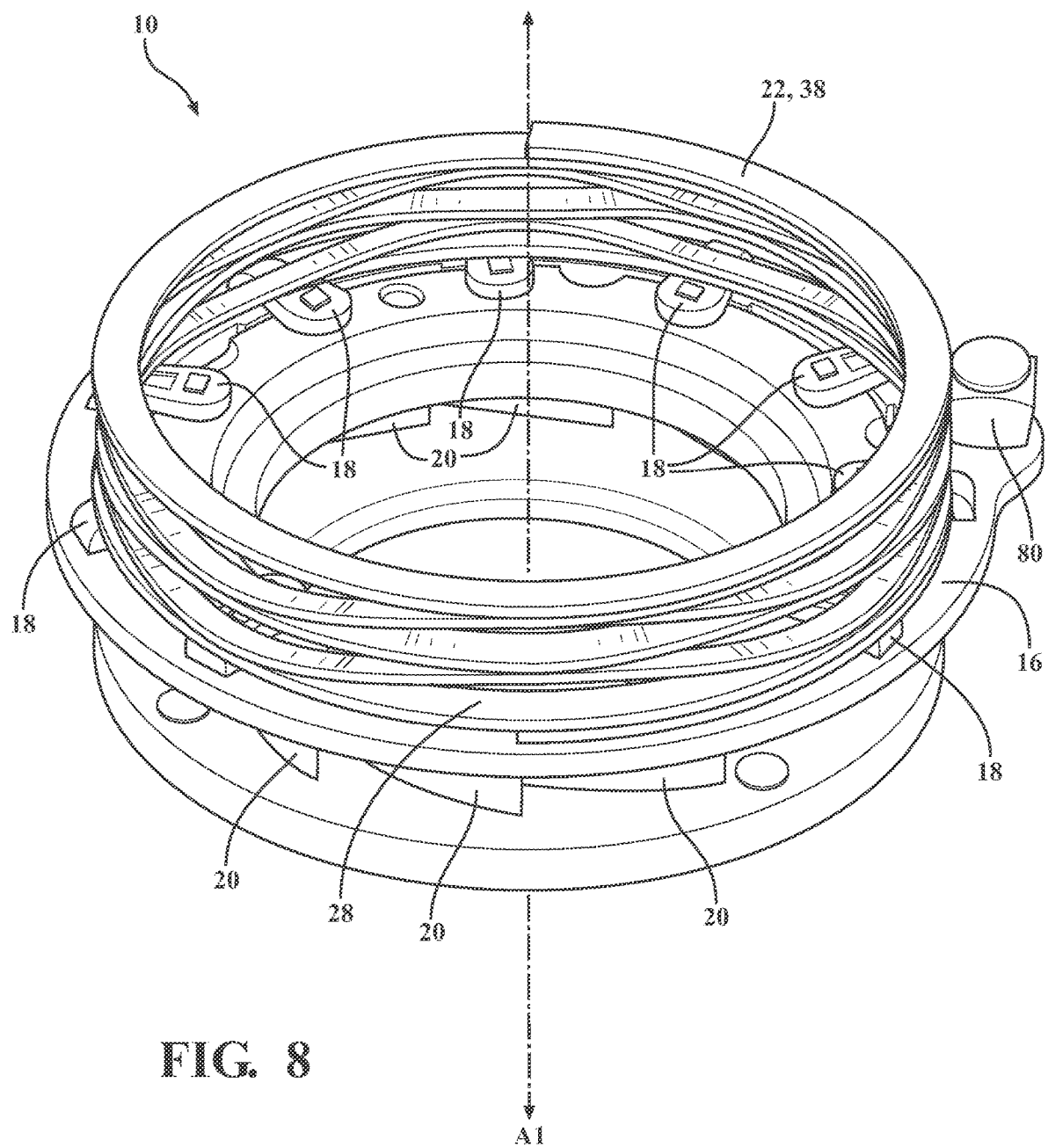
FIG. 8 is a perspective view of the variable turbine geometry assembly according to another embodiment, with the variable turbine geometry assembly including the wave spring, with the wave spring including a shim operably in contact with the at least one vane lever.

Although not required, as shown in FIGS. 3-8, 10, and 11, the at least one trough 26 may extend toward and may be operably in contact with the at least one vane lever 18. The at least one trough 26 may be in direct contact with the at least one vane lever 18. However, the at least one trough 26 need not be in direct contact with the at least one vane lever 18. The at least one trough 26 need only be in operable contact with the at least one vane lever 18. As such, there may be included an additional component(s) disposed between the at least one trough 26 and the at least one vane lever 18 As shown in FIG. 8, the wave spring 22 may include a shim 28 coupled to the at least one trough 26, and the shim 28 may be operably in contact with the at least one vane lever 18. The shim 28 may be in direct contact with the at least one vane lever 18. However, the shim 28 need not be in direct contact with the at least one vane lever 18. The shim 28 need only be in operable contact with the at least one vane lever 18. As such, there may be included an additional component(s) disposed between the shim 28 and the at least one vane lever 18.

The at least one vane lever 18 may be further defined as a plurality of vane levers 18. Moreover, the at least one vane 20 may be further defined as a plurality of vanes 20. It is to be appreciated that the wave spring 22 may be operably in contact with at least two of the plurality of vane levers 18. Said differently, the wave spring 22 may be operably in contact with two of the vane levers 18, three of the vane levers 18, four of the vane levers 18, five of the vane levers 18, six of the vane levers 18, seven of the vane levers 18, eight of the vane levers 18, up to all of the vane levers 18 included in the variable turbine geometry assembly 10. Moreover, the wave spring 22 may be operably in contact with at least three of the vane levers 18. Said differently, the wave spring 22 may be operably in contact with three of the vane levers 18, four of the vane levers 18, five of the vane levers 18, six of the vane levers 18, seven of the vane levers 18, eight of the vane levers 18, up to all of the vane levers 18 included in the variable turbine geometry assembly 10.

Although not required, as shown in FIGS. 2-8, the wave spring 22 may extend circumferentially about a majority of the adjustment ring 16. The wave spring 22 extending circumferentially about a majority of the adjustment ring 16 increases the stability of the wave spring 22 and allows the wave spring 22 to operably contact more than one vane lever 18. In a non-limiting example, the wave spring 22 may be operably in contact with two, three, four, five, six, seven, eight, or more vane levers 18.

The wave spring 22 may be operably in contact with vane levers 18 which are adjacent to one another circumferentially about the axis A1. Alternatively, the wave spring 22 may not be operably in contact with one or more vane levers 18 disposed circumferentially between vane levers 18 which the wave spring 22 is operably in contact with. As a non-limiting example, the wave spring 22 may alternate between being operably in contact with a vane lever 18 and not operably in contact with a vane lever 18 as the wave spring 22 extends circumferentially about the axis A1.

Figure 3:
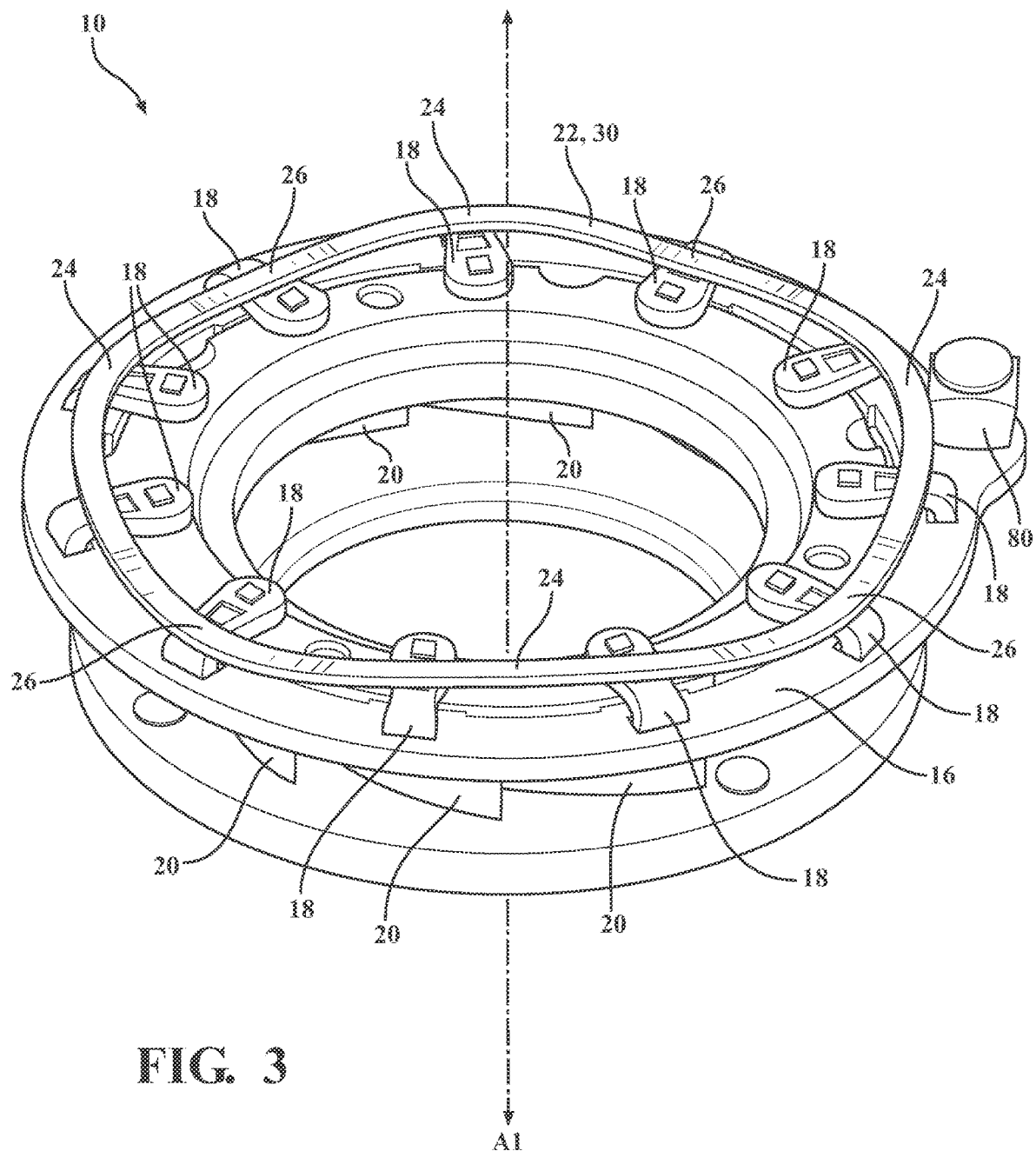
FIG. 3 is a perspective view of the variable turbine geometry assembly according to another embodiment, with the wave spring being a single-turn wave spring.
Figure 4:
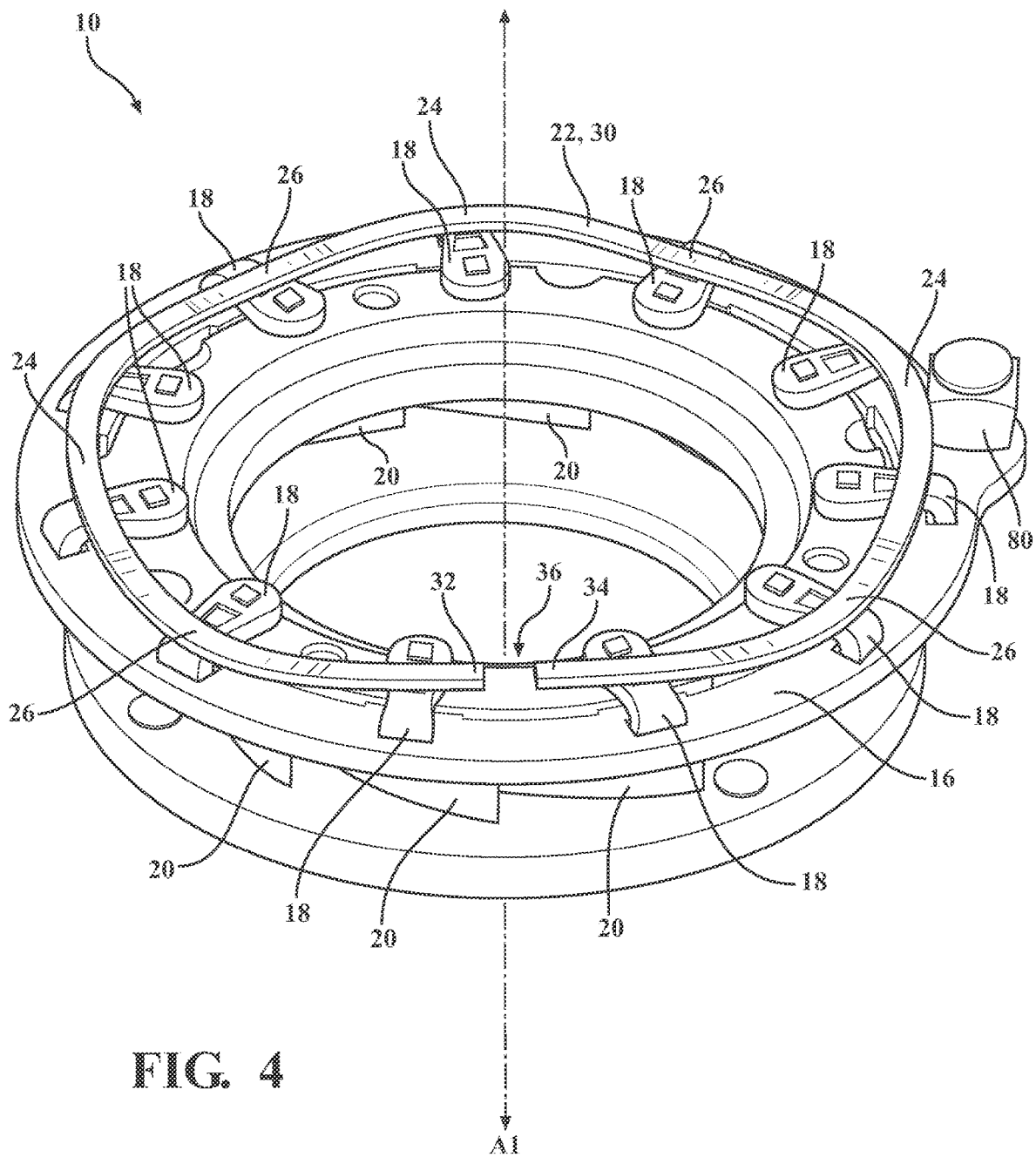
FIG. 4 is a perspective view of the variable turbine geometry assembly according to another embodiment, with the variable turbine geometry assembly including the wave spring, with the wave spring being a single-turn wave spring, and with the single-turn wave spring extending between a first circumferential end and a second circumferential end, and with a gap defined circumferentially between the first circumferential end and the second circumferential end.
Figure 5:
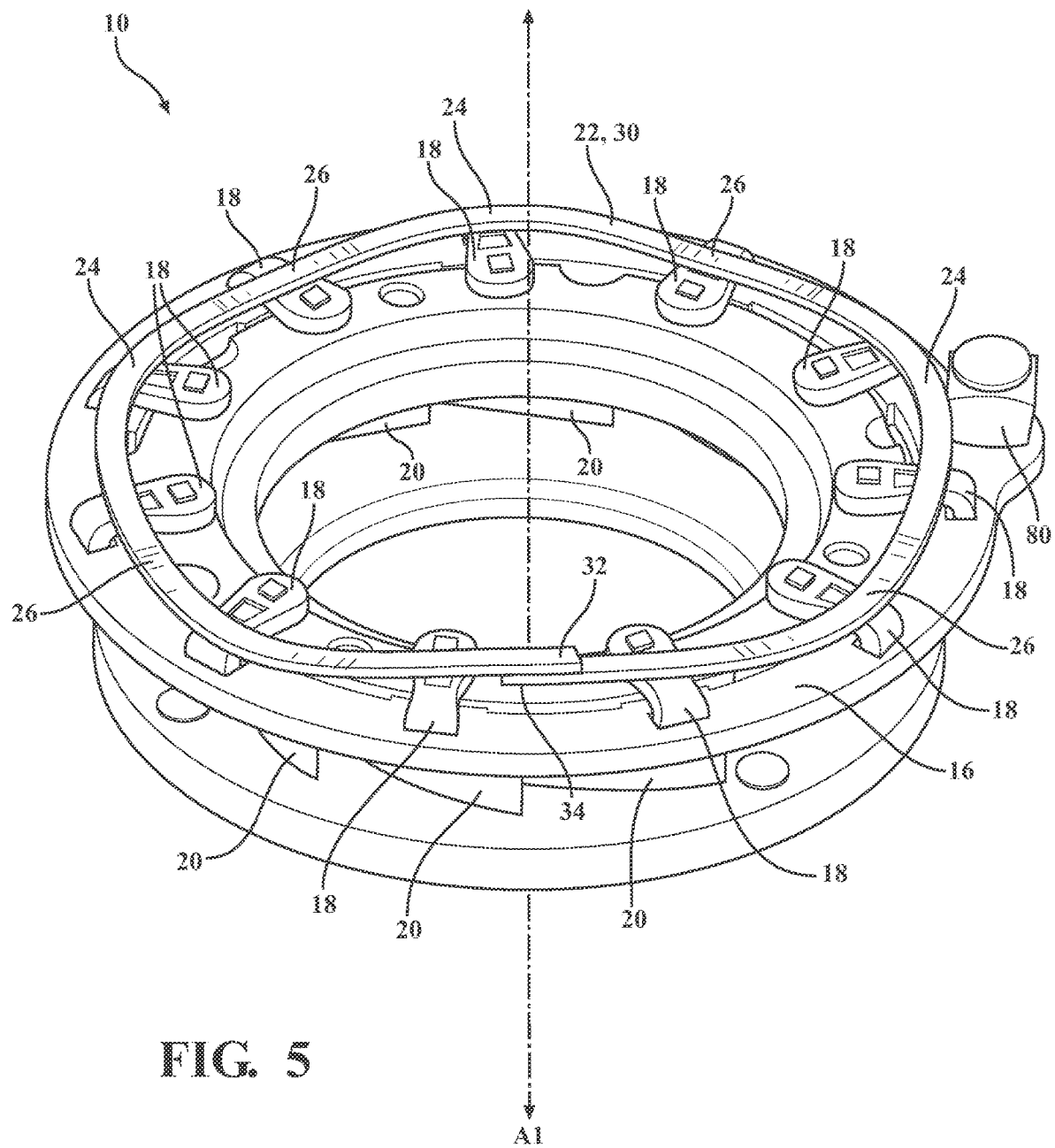
FIG. 5 is a perspective view of the variable turbine geometry assembly according to another embodiment, with the variable turbine geometry assembly including the wave spring, with the wave spring being a single-turn wave spring, and with the first circumferential end of the single-turn wave spring overlapping with the second circumferential end of the single-turn wave spring.

In one embodiment, as shown in FIGS. 3-5, the wave spring 22 is further defined as a single-turn wave spring 30. Although not required, the single-turn wave spring 30 may extend between a first circumferential end 32 and a second circumferential end 34. As shown in FIG. 4, a gap 36 may be defined circumferentially between the first circumferential end 32 of the single-turn wave spring 30 and the second circumferential end 34 of the single-turn wave spring 30. Alternatively, as shown in FIG. 5, the first circumferential end 32 of the single-turn wave spring 22 may overlap with the second circumferential end 34 of the single-turn wave spring 22. However, it is also to be appreciated that the single-turn wave spring 30 may extend integrally completely about the axis A1, and thus have no circumferential ends whatsoever, as shown in FIG. 3. In another embodiment, as shown in FIGS. 7 and 8, the wave spring 22 is further defined as a multi-turn wave spring 38. In another embodiment, as shown in FIG. 6, the wave spring 22 is further defined as nested wave spring 40.

The at least one vane lever 18 may have a contact surface 42 facing away from the adjustment ring 16. The wave spring 22 may be operably in contact with the contact surface 42 of the at least one vane lever 18 to reduce vibration between the adjustment ring 16 and the at least one vane lever 18. Although not required, the contact surface 42 of the at least one vane lever 18 may be indented axially into the at least one vane lever 18 to seat the wave spring 22. Seating the wave spring 22 further increases the stability of the wave spring 22 relative to the adjustment ring 16. Additionally, seating the wave spring 22 prevents the wave spring 22 from rotating about the axis A1 relative to the at least one vane lever 18, thus ensuring that the desired portion of the wave spring 22 (e.g., the trough 26) is operably in contact with the at least one vane lever 18.

The at least one vane lever 18 may have a first lever end 44 coupled to the adjustment ring 16 and a second lever end 46 defining a pin aperture 48. The variable turbine geometry assembly 10 may further include a pin 50 disposed in the pin aperture 48 defined by the second lever end 46 of the at least one vane lever 18. At least one vane 20 may be coupled to the pin 50. The at least one vane 20 may be moveable with respect to the adjustment ring 16 when the adjustment ring 16 rotates about the axis A1. The at least one vane lever 18 also may have an inner lever surface 52 facing the adjustment ring 16 and extending parallel to the adjustment ring 16, and the at least one vane lever 18 may have an axial stop 54 extending axially away from the inner lever surface 52 toward the adjustment ring 16 and configured to limit axial movement of the at least one vane lever 18. Although not required, the first lever end 44 may be fixed to adjustment ring 16 and the second lever end 46 may be fixed to the pin 50.

The at least one vane lever 18, including the axial stop 54 extending axially away from the inner lever surface 52 toward the adjustment ring 16 and configured to limit axial movement of the at least one vane lever 18, reduces relative distances between the at least one vane lever 18 and the adjustment ring 16, thereby allowing the wave spring 22 to more easily reduce vibration, and thus wear, between the at least one vane lever 18 and the adjustment ring 16. Although not required, the axial stop 54 may have a first stop surface 56 facing the adjustment ring 16, a second stop surface 58 facing the axis A1, and a third stop surface 60 opposite the first stop surface 56 facing away from the axis A1.

As shown in FIGS. 3-8, the variable turbine geometry assembly 10 may further include an adjustment projection 80 coupled to the adjustment ring 16 and extending axially away from the adjustment ring 16. The adjustment projection 80 may be coupled to an actuator configured to move the adjustment projection 80 to rotate the adjustment ring 16 about the axis A1 and move the at least one vane 20.

Furthermore, as shown in FIG. 1, the turbocharger 14 includes the variable turbine geometry assembly 10 as shown in FIGS. 2-11. The turbocharger 14 typically includes a shaft 62 extending along the axis A1 between a first shaft end 64 and a second shaft end 66 spaced from the first shaft end 64 along the axis A1. The turbocharger 14 also includes the turbine wheel 12 coupled to the first shaft end 64 of the shaft 62 and a compressor wheel 68 coupled to the second shaft end 66 of the shaft 62. The turbocharger 14 further includes a turbine housing 70 defining a turbine housing interior 72, with the turbine wheel 12 disposed in the turbine housing interior 72, and a compressor housing 74 defining a compressor housing interior 76, with the compressor wheel 68 disposed in the compressor housing interior 76. The turbine housing 70 may be further defined as a dual volute turbine housing 78.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A variable turbine geometry assembly for controlling flow of exhaust gas to a turbine wheel of a turbocharger, said variable turbine geometry assembly comprising:
    an adjustment ring extending about an axis, with said adjustment ring rotatable about said axis;
    at least one vane lever coupled to said adjustment ring;
    at least one vane coupled to said at least one vane lever, with said at least one vane moveable with respect to said adjustment ring when said adjustment ring rotates about said axis; and
    a wave spring operably in contact with at least one of said at least one vane lever and said adjustment ring, wherein said wave spring is configured to bias one of said at least one vane lever and said adjustment ring toward the other of said at least one vane lever and said adjustment ring.

2. The variable turbine geometry assembly as set forth in claim 1, wherein said wave spring is disposed between said adjustment ring and said at least one vane.

3. The variable turbine geometry assembly as set forth in claim 1 further comprising a first vane ring extending about said axis and a second vane ring extending about said axis, with said second vane ring spaced from said first vane ring such that said at least one vane is disposed between said first vane ring and said second vane ring.

4. The variable turbine geometry assembly as set forth in claim 3, wherein said wave spring is disposed between said adjustment ring and said first vane ring.

5. The variable turbine geometry assembly as set forth in claim 3, wherein said wave spring is in direct contact with said first vane ring.

6. The variable turbine geometry assembly as set forth in claim 5, wherein said wave spring is in direct contact with said adjustment ring.

7. The variable turbine geometry assembly as set forth in claim 1, wherein said wave spring is in direct contact with said adjustment ring.

8. The variable turbine geometry assembly as set forth in claim 1, wherein said wave spring is configured to reduce vibration between said adjustment ring and said at least one vane lever.

9. The variable turbine geometry assembly as set forth in claim 1, wherein said wave spring includes at least one peak extending away from said adjustment ring and at least one trough extending toward said adjustment ring.

10. The variable turbine geometry assembly as set forth in claim 9, wherein said wave spring includes at least three peaks extending away from said adjustment ring and at least three troughs extending toward said adjustment ring.

11. The variable turbine geometry assembly as set forth in claim 9, wherein said at least one trough in direct contact with said adjustment ring.

12. The variable turbine geometry assembly as set forth in claim 9 further comprising a first vane ring extending about said axis and a second vane ring extending about said axis, with said second vane ring spaced from said first vane ring such that said at least one vane is disposed between said first vane ring and said second vane ring, wherein said at least one trough extends toward and is in direct contact with said first vane ring.

13. The variable turbine geometry assembly as set forth in claim 1, wherein said wave spring is chosen from a single-turn wave spring, a multi-turn wave spring, and a nested wave spring.

14. The variable turbine geometry assembly as set forth in claim 1, wherein said wave spring is in direct contact with said at least one vane lever.

15. The variable turbine geometry assembly as set forth in claim 9, wherein said wave spring includes a shim coupled to said at least one trough, and wherein said shim is in direct contact with said at least one vane lever.

16. The variable turbine geometry assembly as set forth in claim 1, wherein said at least one vane lever is further defined as a plurality of vane levers, wherein said at least one vane is further defined as a plurality of vanes, and wherein said wave spring is operably in contact with at least three of said plurality of vane levers.

17. The variable turbine geometry assembly as set forth in claim 1, wherein said at least one vane lever has a contact surface facing away from said adjustment ring, and wherein said wave spring is operably in contact with said contact surface to reduce vibration between said adjustment ring and said at least one vane lever.

18. The variable turbine geometry assembly as set forth in claim 17, wherein said contact surface of said at least one vane lever is indented axially into said at least one vane lever to seat said wave spring.

19. A turbocharger comprising said variable turbine geometry assembly as set forth in claim 1 and further comprising,
    a shaft extending along said axis between a first shaft end and a second shaft end spaced from said first shaft end along said axis;
    a turbine wheel coupled to said first shaft end of said shaft;
    a compressor wheel coupled to said second shaft end of said shaft; and
    a turbine housing defining a turbine housing interior, with said turbine wheel disposed in said turbine housing interior.

20. The turbocharger as set forth in claim 19, wherein said turbine housing is further defined as a dual volute turbine housing.

\* \* \* \* \*